United States Patent
Hyde et al.

(10) Patent No.: US 11,225,214 B2
(45) Date of Patent: Jan. 18, 2022

(54) WINDOW STRIKER

(71) Applicant: Ford Global Technologies, LLC, Dearborn, MI (US)

(72) Inventors: Joseph Hyde, Flint, MI (US); Garam Jun, Ann Arbor, MI (US); Joseph Edward Abramczyk, Farmington Hills, MI (US); Nathan Kristofor Tardif, Ferndale, MI (US); Matthew B. Makowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 16/533,364

(22) Filed: Aug. 6, 2019

(65) Prior Publication Data

US 2021/0039575 A1 Feb. 11, 2021

(51) Int. Cl.
*B60K 1/00* (2006.01)
*B60R 21/00* (2006.01)
*B60Q 9/00* (2006.01)
*A62B 3/00* (2006.01)
*B60R 16/033* (2006.01)
*E05F 15/60* (2015.01)

(52) U.S. Cl.
CPC .............. *B60R 21/00* (2013.01); *A62B 3/005* (2013.01); *B60Q 9/00* (2013.01); *B60R 16/033* (2013.01); *B60R 2021/0027* (2013.01); *E05F 15/60* (2015.01); *E05Y 2900/55* (2013.01)

(58) Field of Classification Search
CPC .................. B60R 21/00; B60R 16/033; B60R 2021/0027; A62B 3/005; B60Q 9/00; E05F 15/60; E05Y 2900/55
USPC ............................................................ 701/36
See application file for complete search history.

(56) References Cited

U.S. PATENT DOCUMENTS

| 7,170,401 | B1 * | 1/2007 | Cole | B60N 2/002 |
| | | | | 340/439 |
| 8,727,060 | B1 * | 5/2014 | Erickson | A62B 3/005 |
| | | | | 180/271 |
| 9,233,660 | B1 * | 1/2016 | Farooq | B60R 21/02 |
| 9,614,259 | B2 | 4/2017 | Bergmann et al. | |
| 2003/0089755 | A1 * | 5/2003 | Peers-Smith | A62B 3/005 |
| | | | | 225/103 |
| 2004/0056652 | A1 * | 3/2004 | Bomya | B60R 21/0136 |
| | | | | 324/207.17 |
| 2006/0025897 | A1 * | 2/2006 | Shostak | G08G 1/017 |
| | | | | 701/1 |
| 2006/0064822 | A1 * | 3/2006 | Wang | B25D 1/14 |
| | | | | 7/144 |
| 2006/0191206 | A1 * | 8/2006 | Mooney | B60J 5/06 |
| | | | | 49/502 |

(Continued)

FOREIGN PATENT DOCUMENTS

| CN | 206926766 U | 1/2018 |
| KR | 100323091 B1 | 2/2002 |
| KR | 20170007723 A | 1/2017 |

*Primary Examiner* — Kerri L McNally
*Assistant Examiner* — Thang D Tran
(74) *Attorney, Agent, or Firm* — Frank A. MacKenzie; Bejin Bieneman PLC (57) ABSTRACT

A vehicle includes a window and a striker positioned to strike the window. The vehicle includes an actuator positioned to drive the striker. The vehicle includes a temperature sensor in communication with the actuator.

17 Claims, 7 Drawing Sheets

(56) References Cited

U.S. PATENT DOCUMENTS

| | | | | |
|---|---|---|---|---|
| 2008/0125940 A1* | 5/2008 | Breed | B60R 21/013 | |
| | | | 701/45 | |
| 2009/0229485 A1* | 9/2009 | Parks | B60R 21/34 | |
| | | | 102/530 | |
| 2012/0002338 A1* | 1/2012 | Smith | H01M 10/625 | |
| | | | 361/116 | |
| 2013/0146381 A1* | 6/2013 | Oosterhuis | B60J 1/20 | |
| | | | 180/271 | |
| 2016/0130843 A1* | 5/2016 | Bingle | E05B 81/80 | |
| | | | 292/242 | |
| 2016/0344074 A1* | 11/2016 | Zhou | H01M 10/613 | |
| 2016/0346569 A1* | 12/2016 | Goodman | A62B 3/005 | |
| 2017/0002883 A1* | 1/2017 | Donzelli | G01L 1/16 | |
| 2017/0182939 A1* | 6/2017 | Phatak | G08B 21/22 | |
| 2017/0342761 A1* | 11/2017 | Conner | E05F 15/71 | |
| 2018/0050575 A1* | 2/2018 | Campbell | B60R 21/01536 | |
| 2018/0086224 A1* | 3/2018 | King | H01M 10/613 | |
| 2018/0108369 A1* | 4/2018 | Gross | G07C 5/085 | |
| 2019/0041291 A1* | 2/2019 | Bialik | G01M 3/02 | |
| 2019/0359127 A1* | 11/2019 | Alfano | B60Q 5/005 | |
| 2020/0255002 A1* | 8/2020 | Chen | G08G 1/166 | |
| 2020/0361281 A1* | 11/2020 | Williams | B60H 1/00885 | |

\* cited by examiner

WINDOW STRIKER

BACKGROUND

A battery-electric vehicle includes battery cells that power the vehicle, including propulsion of the vehicle. For example, wheels of the vehicle are powered by electric motors that are powered by the battery cells. The battery cells may also provide power to actuate locks and windows of the vehicle.

DETAILED DESCRIPTION

A vehicle includes a window and a striker positioned to strike the window. The vehicle includes an actuator positioned to drive the striker. The vehicle includes a temperature sensor in communication with the actuator.

The vehicle may include a computer having a processor and a memory storing instructions executable by the processor determine that data from the temperature sensor specifies a temperature above a threshold temperature, and, in response to determining the temperature is above the threshold temperature, command the actuator to drive the striker into the window.

The instructions may include instructions to wait a minimum amount of time after determining the temperature is above the threshold temperature before commanding the actuator.

The instructions may include instructions to command a user interface to alert a vehicle occupant while waiting the minimum amount of time.

The vehicle may include a battery assembly, the temperature sensor positioned to detect a temperature of the battery assembly.

The temperature sensor may be supported by the battery assembly.

The temperature sensor may be molded into the battery assembly.

The vehicle may include a passenger cabin above the battery assembly.

The temperature sensor may be a piezoelectric sensor.

The actuator may include a pyrotechnic charge.

The vehicle may include a door supporting the window.

A system includes a computer having a processor and memory storing instructions executable by the processor to determine that a temperature of a battery assembly is above a threshold temperature, and, in response to determining the temperature is above the threshold temperature, command an actuator to drive a striker into a window.

The instructions may further include instructions to determine that the temperature is above the threshold temperature based on data from a temperature sensor.

The instructions may further include instructions to wait a minimum amount of time after determining the temperature is above the threshold temperature before commanding the actuator.

The instructions may further include instructions to command a user interface to alert a vehicle occupant while waiting the minimum amount of time.

The instructions may further include instructions to, in response to receiving data specifying an override, refrain from commanding the actuator.

A method includes determining whether a temperature of a battery assembly is above a threshold temperature, and, in response to determining the temperature is above the threshold temperature, commanding an actuator to drive a striker into a window.

The method may include, in response to determining the temperature is not above the threshold temperature, refraining from commanding the actuator from driving the striker into the window.

The determining whether the temperature is above the threshold temperature may be based on data from a temperature sensor.

The method may include waiting a minimum amount of time after determining the temperature is above the threshold temperature before commanding the actuator.

The method may include commanding a user interface to alert a vehicle occupant while waiting the minimum amount of time.

The method may include, in response to receiving data specifying an override while waiting the minimum amount of time, refraining from commanding the actuator.

A computer may have a processor and a memory storing instructions executable by the processor to perform the method.

A computer readable medium may store instructions executable by a processor to perform the method.

With reference to FIGS. 1-6, a vehicle 20 having a window breaking assembly 22 includes a window 24 and a striker 26 (illustrated in FIGS. 4 and 5) positioned to strike the window 24. The assembly 22 includes an actuator 28 positioned to drive the striker 26 into the window 24. The assembly 22 includes a temperature sensor 30 in communication with the actuator 28, e.g., via a communication network 32 and a computer 34 (illustrated in FIG. 6). The computer 34 has a processor and memory storing instructions executable by the processor to determine that a temperature of a battery assembly 36 of the vehicle 20 is above a threshold temperature, e.g., based on data from the temperature sensor 30. The instructions include instructions to command the actuator 28 to drive the striker 26 into the window 24 in response to determining the temperature is above the threshold temperature.

Figure 1:
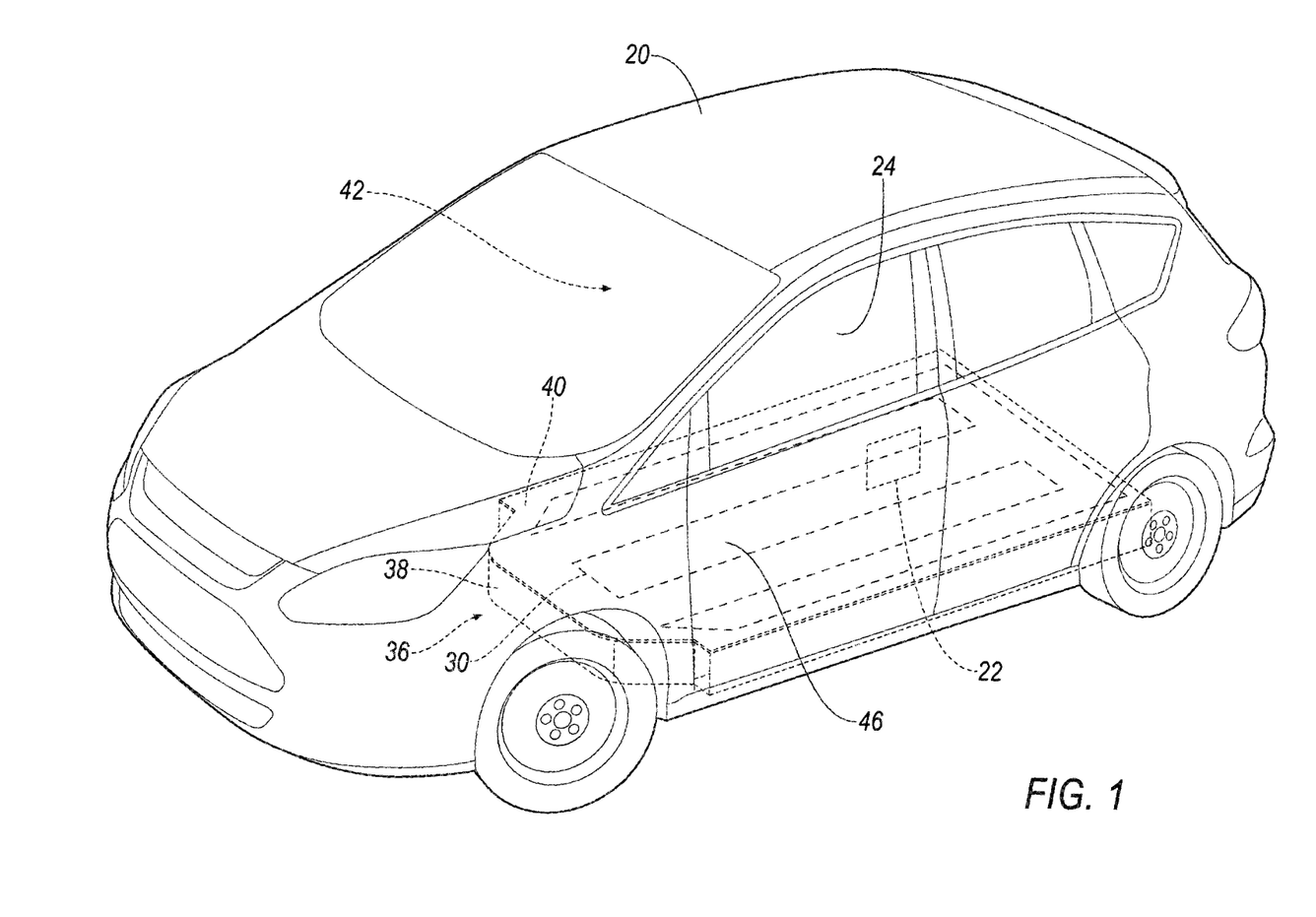
FIG. 1 is a perspective view of a battery-electric vehicle having a battery assembly and a window-breaking assembly.

The window breaking assembly 22 breaks the window 24 when the temperature of the battery assembly 36 exceeds the threshold temperature, e.g., to permit an occupant of the vehicle 20 to exit the vehicle 20 via an opening previously covered by the window 24 prior to breaking. For example, an incapacitated occupant may be removed form the vehicle 20 via the broken window 24 by person outside the vehicle 20.

The vehicle 20 may be any passenger or commercial automobile such as a car, a truck, a sport utility vehicle, a crossover, a van, a minivan, a taxi, a bus, etc. The vehicle 20 may be of any type, e.g., a passenger automobile, taxi, ride-sharing automobile, etc.

The vehicle 20 includes a vehicle frame. The vehicle frame may be of a unibody construction in which the frame is unitary with a vehicle body (including frame rails, pillars, roof rails, etc.). As another example, the body and frame may have a body-on-frame construction (also referred to as a cab-on-frame construction) in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc.

The vehicle 20 is a battery-electric vehicle. In other words, propulsion of the vehicle 20 is powered electrically by the battery assembly 36. For example, electric motors powered by the battery assembly 36 may be operatively coupled to tires of the vehicle 20 such that torque generated by the electric motors rotates the tires and propels the vehicle 20.

The battery assembly 36 provides electrical power for operating the vehicle 20. The battery assembly 36 includes a battery. The battery may include cells that store electricity, such as galvanic cells, electrolytic cells, fuel cells, flow cells and voltaic piles. For example, the cells may be lithium ion cells, nickel-cadmium cells, lithium polymer cells, etc. The battery assembly 36 may include hardware, e.g., wiring, connectors, circuits, etc., for connecting the battery to electrify components of the vehicle 20.

Figure 2:
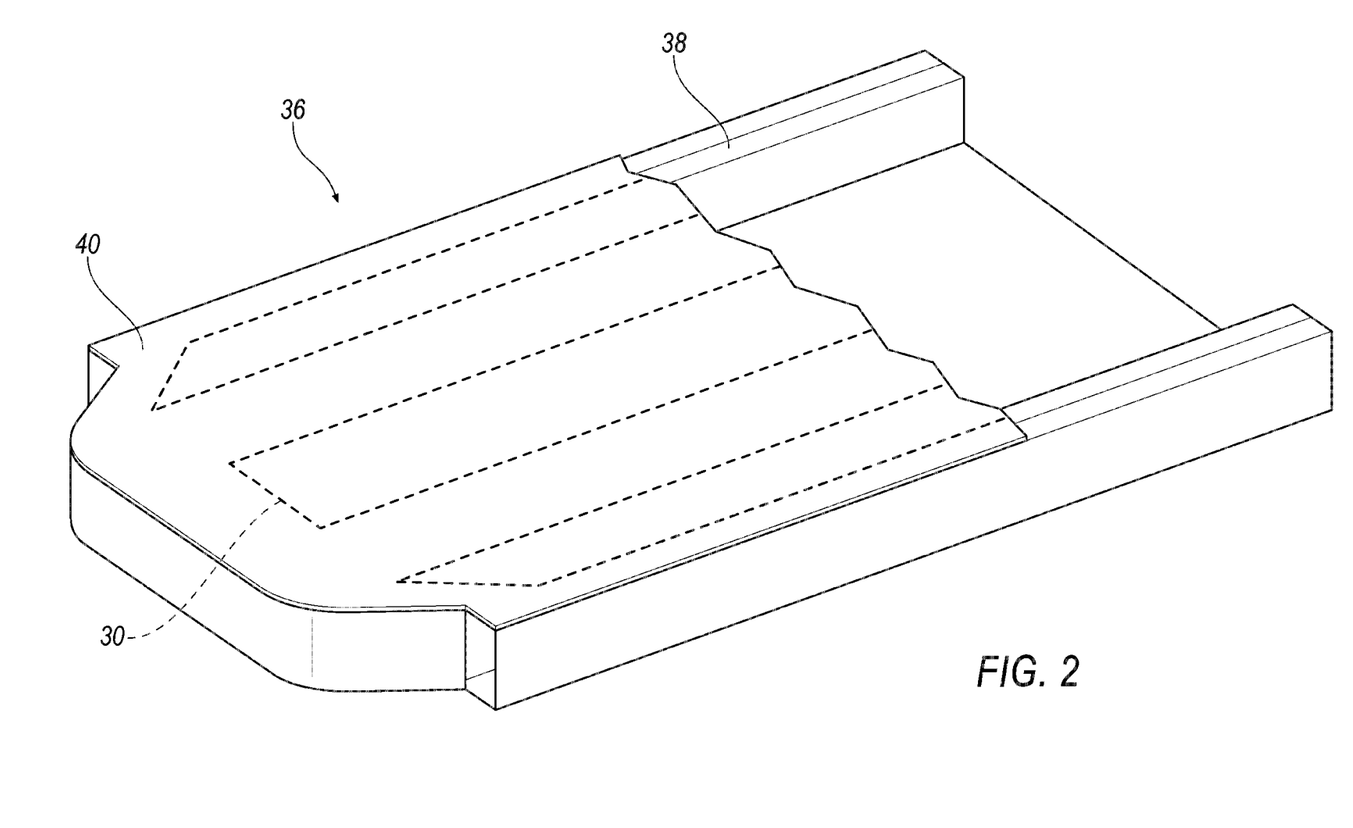
FIG. 2 is a perspective view of the battery assembly.

The battery assembly 36 may include a tray 38. The tray 38 may support the battery. The tray 38 may house the battery, e.g., preventing intrusion of precipitation and dirt to the battery. For example, the tray 38 may include a bottom panel and side walls defining a chamber. The battery may be in the chamber. The tray 38 may be supported by, e.g., fixed to, the frame and/or body of the vehicle 20, e.g., via fasteners, welding, etc.

A top panel 40 may enclose and further define the chamber. The top panel 40 may separate internal components, e.g., the battery, wiring, etc., from components of the vehicle 20 above the battery assembly 36, e.g., a passenger cabin 42. For example, the top panel 40 may be a floor of the passenger cabin 42.

The passenger cabin 42 is designed to house occupants, if any, of the vehicle 20. The passenger cabin 42 is enclosed (at least partially) by the body. The passenger cabin 42 includes one or more seats. The passenger cabin 42 may be above the battery assembly 36. In other words, the battery assembly 36 may be between the passenger cabin 42, e.g., the seat of the passenger cabin 42, and a surface, e.g., a roadway, supporting tires of the vehicle 20.

Figure 6:
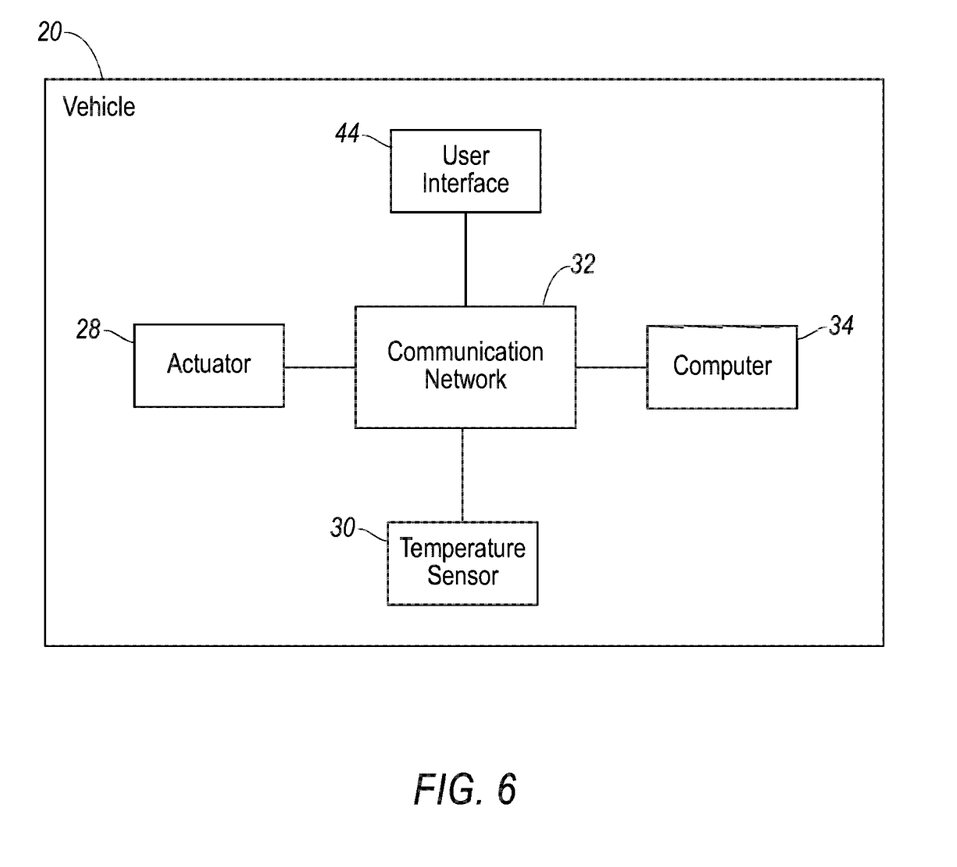
FIG. 6 is a block diagram of components of the vehicle.

The vehicle 20 may include a user interface 44 (illustrated in FIG. 6). The user interface 44 presents information to and receives information from an occupant of the vehicle 20. The user interface 44 may be located, e.g., on an instrument panel in a passenger cabin 42 of the vehicle 20, or wherever may be readily seen by the occupant. The user interface 44 may include dials, digital readouts, screens such as a touch-sensitive display screen, speakers, and so on for providing information to the occupant, e.g., human-machine interface (HMI) elements. The user interface 44 may include buttons, knobs, keypads, microphone, and so on for receiving information from the occupant.

Figure 3:
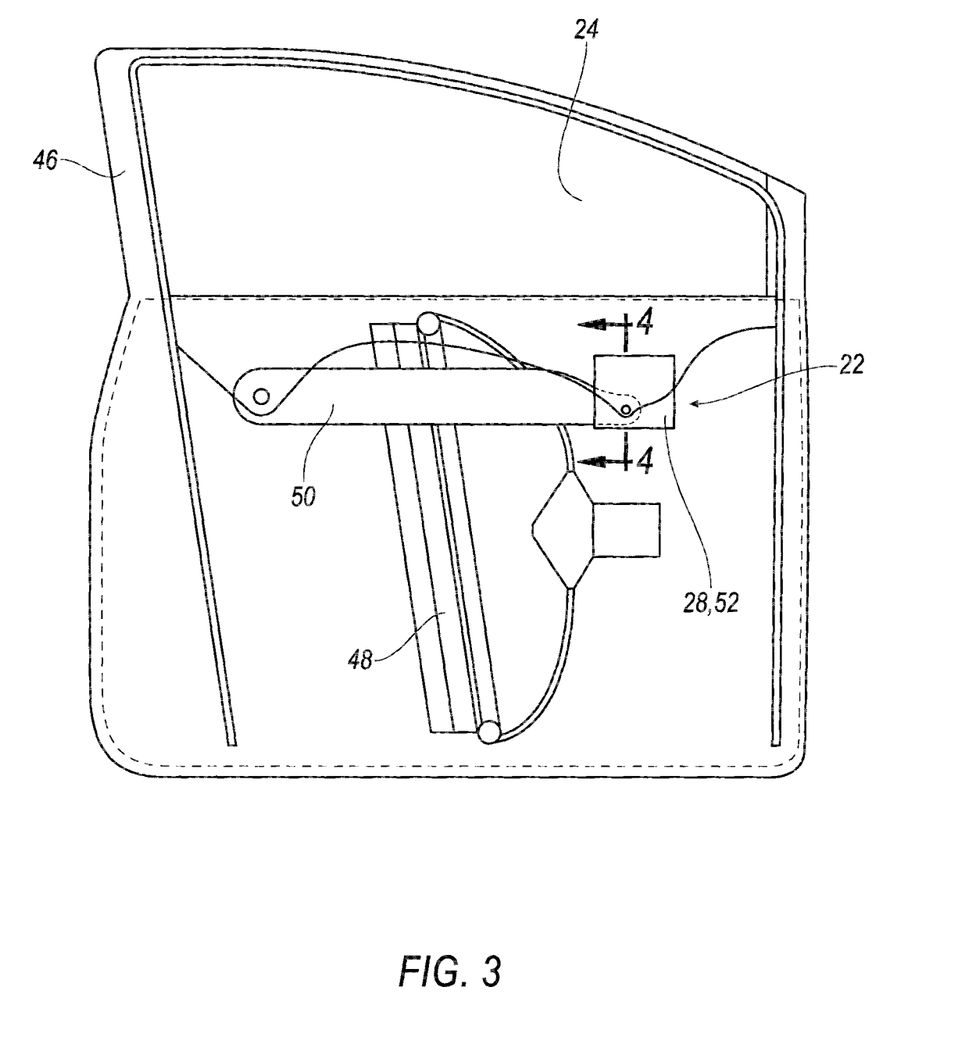
FIG. 3 is a plan view of a door of the battery-electric vehicle illustrating the window-breaking assembly.

The vehicle 20 includes at least one door 46. The door 46 may move between an open position and a closed position. The door 46 in the open position permits an occupant to enter and exit the passenger cabin 42. The door 46 in the closed position restricts entry and exit of the occupant to and from the passenger cabin 42. The door 46 may include a frame. The frame may be metal (e.g., aluminum, steel, etc.), composite material (e.g., fiber reinforced thermoplastic, sheet molding compound (SMC), etc., or any suitable material. The door 46 may include a trim panel. The trim panel may be fixed to the frame in any suitable way, e.g., threaded fasteners, clips, push-pins, Christmas tree fasteners, etc. The trim panel may be formed of plastic, foam, leather, vinyl, etc. and combinations thereof.

The window 24 is supported by the door 46, e.g., by the frame of the door 46. The window 24 may be tempered glass, laminated glass, or any other suitable material. The window 24 may be movable between a raised position and a lowered position. The window 24 in the raised position covers an opening of the door 46. In the lower position the window 24 covers less (if any) of the opening relative to the raised position.

For example, and with reference to FIG. 3, a track 48 may be support within the door 46, e.g., by the frame of the door 46. A carriage 50 may be supported by and moveable along the track 48. The window 24 may be supported by the carriage 50, e.g., fixed to the carriage 50 via fastener, adhesive, etc. Movement of the carriage 50 of along the track 48 may move the window 24 between the raised position and the lowered position. An electric motor may be operatively coupled to the carriage 50 to move the carriage 50 along the track 48, e.g., via a pulley, a cable, etc. Other conventional structure for moving the window 24 between the raised position and the lowered position may be supported by the door 46. The motor, or other electromechanical structure, that moves the window 24 between the raised position and the lowered position may be powered by the battery assembly 36.

Figure 4:
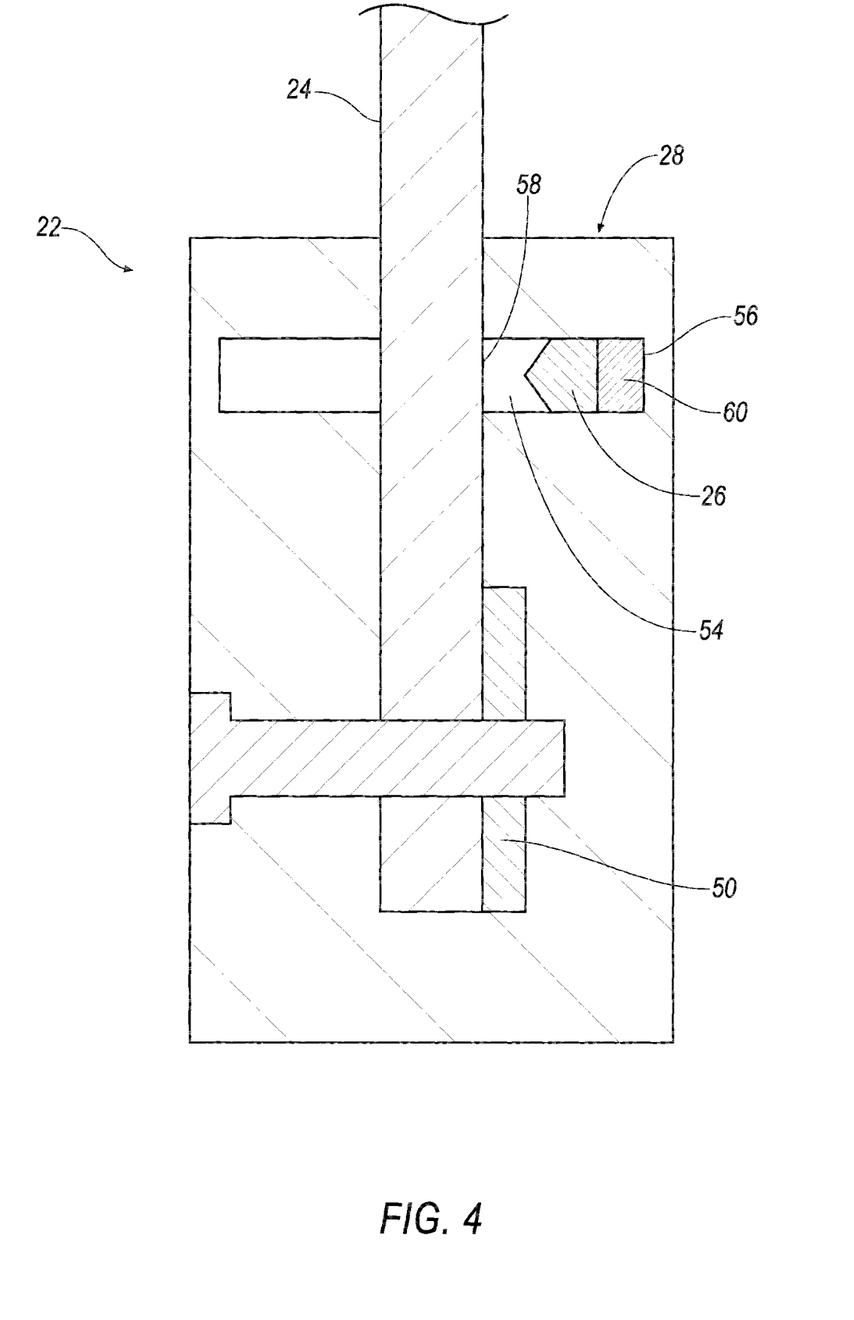
FIG. 4 is a cross-sectional view of the window-breaking assembly and a window.
Figure 5:
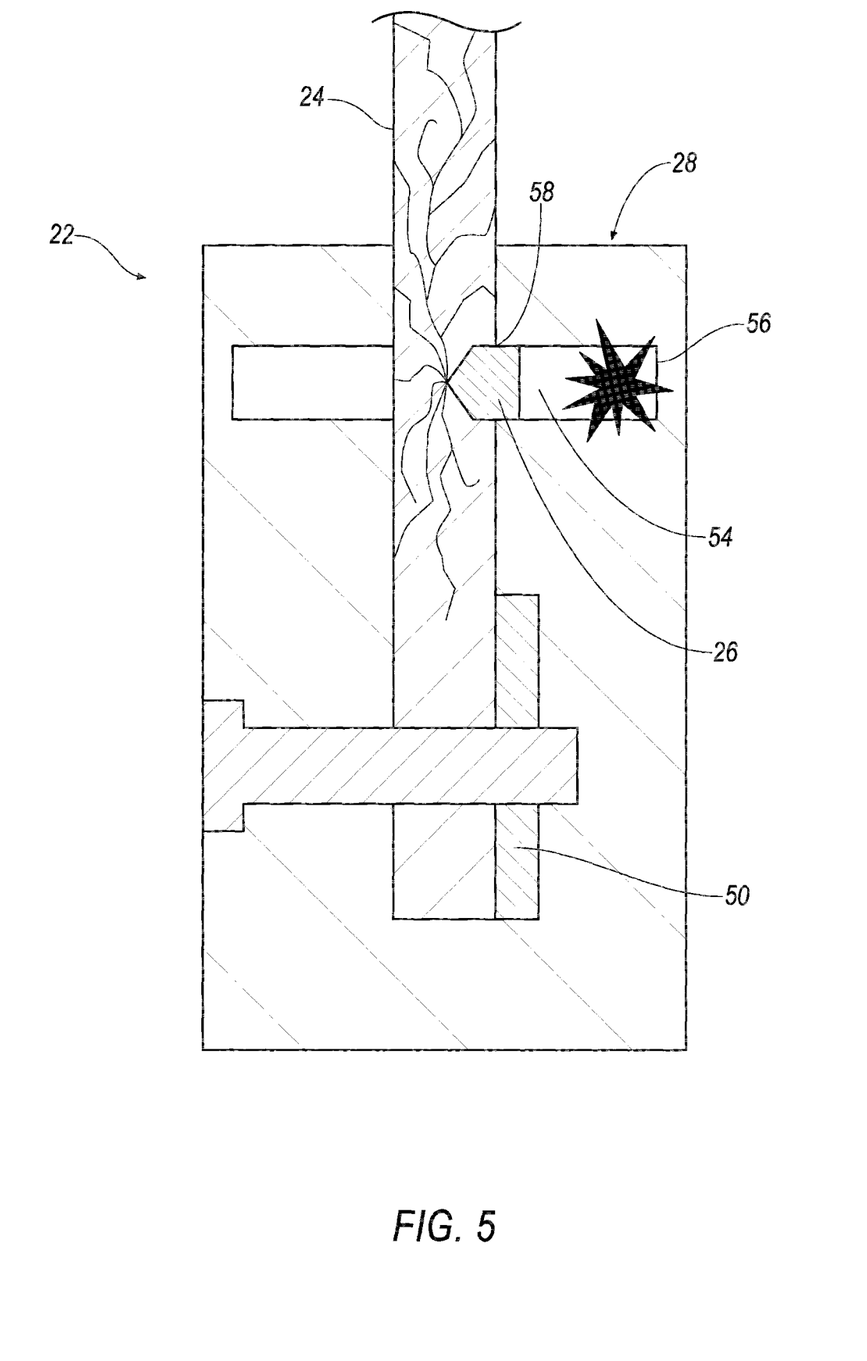
FIG. 5 is a cross-sectional view of the window-breaking assembly and after braking the window.

With reference to FIGS. 4 and 5, the actuator 28 may apply force the striker 26. The actuator 28 is positioned to drive the striker 26 toward the window 24, e.g., such that the striker 26 applies sufficient force to break the window 24. For example, the actuator 28 may include a base 52. The base 52 may define a passage 54. The passage 54 may extend from a closed end 56 within the base 52 to an open end 58 at an outer surface of the base 52. The open end 58 may face the window 24. The actuator 28 may include a pyrotechnic charge 60. The pyrotechnic charge 60 may be combustible to produce a gas. The pyrotechnic charge 60 may be formed of a solid mixture of substances that, when ignited, e.g., in response to receiving an electrical pulse, react to produce the gas. For example, the pyrotechnic charge 60 may be formed of sodium azide ($NaNO_3$), potassium nitrate ($KNO_3$), and silicon dioxide ($SiO_2$), which react to form nitrogen gas ($N_2$). The pyrotechnic charge 60 may be in the passage 54 at the closed end 56. Alternatively, the actuator 28 may be an electromechanical actuator, e.g., having an inductive coil that generates force with via magnetic field, a mechanical actuator, e.g., having a spring, or any other suitable actuator, including a combination thereof.

The striker 26 is designed the break the window 24. The striker 26 may be generally cylindrical and have a conical end. The striker 26 is positioned to strike the window 24, i.e., such that from force from the actuator 28 is transferred to the window 24. The striker 26 may be supported by the actuator 28. For example, the striker 26 may be in the passage 54 between the pyrotechnic charge 60 and the open end 58 (illustrated in FIG. 4). The conical end may point toward the window 24. Combustion of the pyrotechnic charge 60 may urge the striker 26 away from the closed end 56 and into the window 24 (illustrated in FIG. 5).

The actuator 28 may be supported by window 24. For example, the base 52 may be fixed to the window 24, e.g., via fastener, adhesive, etc. Additional or alternatively, the actuator 28 may be supported by the carriage 50, or other suitable structure, e.g., such that the actuator 28 moves with the window 24 as the window 24 moves between the raised position and the lowered position.

The window breaking assembly 22 can include additional actuators 28 and strikers 26 (not shown) to break the window 24. The strikers 26 may be disposed on opposing sides of the window 24, i.e., one striker 26 may be inboard of the window 24 and another striker 26 may be outboard of the window 24. The multiple strikers 26 may provide additional force to break the window 24 relative to a single striker 26 and actuator 28. For example, when the window 24 is laminated glass the strikers 26 can each break glass on one side of an interlayer of the window 24 to which the glass is bonded such that the glass is broken on both sides of the interlayer.

With reference to FIG. 2, the temperature sensor 30 generates data specifying a temperature detected by the temperature sensor 30. The temperature sensor 30 may be a piezoelectric sensor that uses the piezoelectric effect to create an electrical charge based on the detected temperature. The piezoelectric sensor may include thermal material that changes orientation and shape based on the detected temperature. The piezoelectric sensor may include wiring that changes in resistance based on the temperature of the battery assembly 36. The temperature sensor 30 may be a thermistor, a resistance thermometer, a thermocouple, a semiconductor-based sensor, or any other suitable sensor for detecting temperature.

The temperature sensor 30 is positioned to detect a temperature of the battery assembly 36. In other words, the temperature sensor 30 is positioned such that heat energy of the battery assembly 36, e.g., generated by the battery, is detectable by the temperature sensor 30 and the temperature sensor 30 can generate data specifying the amount, or temperature, of such heat energy. The temperature sensor 30 may be supported by the battery assembly 36. For example, the temperature sensor 30 may be housed in the chamber defined by the tray 38. Additionally or alternatively, the temperature sensor 30 may be fixed to the battery assembly 36, e.g., to the tray 38, the top panel 40, etc. For example, the temperature sensor 30 may molded into the battery assembly 36. In other word, the battery assembly 36, e.g., the tray 38, the top panel 40, etc., may surround and abut the temperature sensor 30. The temperature sensor 30 may extend along a width and length of the battery assembly 36, e.g., to provide uniform temperature detection.

The temperature sensor 30 is in communication with the actuator 28, i.e., such that the actuator 28 drives the striker 26 into the window 24 in response to the temperature sensor 30 generating data specifying a temperature above the threshold temperature. For example, data from the temperature sensor 30 may be communicated to the computer 34 via the communication network 32, and a command from the computer 34 may be communicated to the actuator 28 via the communication network 32, as further described below.

The threshold temperature may be a temperature above a nominal operational temperature of the battery assembly 36. In other words, the battery assembly 36 having a temperature at or above the threshold temperature may indicate that the battery assembly 36 is overheating and may soon cease to provide electric power. For example, the threshold temperature may be a maximum temperature at which the battery assembly 36 is operational and/or a minimum temperature at which the battery assembly 36 becomes inoperable. The threshold temperature may be at temperature at which the battery is at increased risk of combustion. For example, the threshold temperature may be 90% of a combustion temperature of the battery. The threshold temperature may be determined based on empirical testing and analysis of the battery, the vehicle 20, conditions of the vehicle 20, ambient conditions surrounding the vehicle 20, etc. The threshold temperature may be stored in memory of the computer 34 of the vehicle 20, e.g., upon manufacture of the vehicle 20, provided to the vehicle 20 as an update to data stored in memory of the computer 34, etc.

With reference to FIG. 6, the communication network 32 facilitates communication among components of the vehicle 20, such as the computer 34, the temperature sensor 30, the actuator 28, the user interface 44, etc. The communication network 32 may facilitate wired or wireless communication among the components in accordance with a number of communication protocols such as controller area network (CAN), Ethernet, WiFi, Local Interconnect Network (LIN), and/or other wired or wireless mechanisms. For example, the communication network 32 may include a communication bus, one or more transceivers, etc.

The computer 34, implemented via circuits, chips, and/or other electronic components, is included for carrying out various operations, including as described herein. The computer 34 is a computing device that generally includes a processor and a memory, the memory including one or more forms of computer-readable media and storing instructions executable by the processor for performing various operations, including as disclosed herein. The memory of the computer 34 further generally stores remote data received via various communications mechanisms; e.g., the computer 34 is generally configured for communications on the communication network 32 or the like, and/or for using other wired or wireless protocols, e.g., Bluetooth, etc. The computer 34 may also have a connection to an onboard diagnostics connector (OBD-II). Via the communication network 32 and/or other wired or wireless mechanisms, the computer 34 may transmit and receive messages to and from various devices in the vehicle 20, e.g., the user interface 44, the temperature sensor 30, the actuator 28, etc. Although one computer 34 is shown in FIG. 6 for ease of illustration, it is to be understood that the computer 34 could include, and various operations described herein could be carried out by, one or more computing devices.

The computer 34 is programmed to, i.e., the memory stores instructions executable by the processor to, determine whether data from the temperature sensor 30 specifies a temperature above the threshold temperature. In other words, the computer 34 determines whether the temperature of the battery assembly 36 is at or above the threshold temperature based on data from the temperature sensor 30. The computer 34 may determine whether the data from the temperature sensor 30 specifies a temperature above the threshold temperature by comparing the temperature specified by the data from the temperature sensor 30 with the threshold temperature. The computer 34 may determine that data from the temperature sensor 30 specifies a temperature at or above the threshold temperature when the temperature specified by the data from the temperature sensor 30 is greater than the threshold temperature. The computer 34 may determine the temperature specified by the data from the temperature sensor 30 is not above the threshold temperature when the temperature specified by the data from the temperature sensor 30 is less than the threshold temperature.

The computer 34 is programmed to command the actuator 28 to drive the striker 26 into the window 24. For example, the computer 34 may transmit data to the actuator 28 via the communication network 32 and specifying combustion of the pyrotechnic charge 60. The computer 34 may transmit such command in response to determining the temperature of the battery assembly 36 is above the threshold temperature. The computer 34 may wait for a minimum amount of time to lapse after determining the temperature is above the threshold temperature before commanding the actuator 28. Waiting the minimum amount of time permits an occupant to intervene before the window 24 is broken by the window breaking assembly 22. The minimum amount of time is a value. Specifically, the minimum amount of time is predetermined value. The minimum amount of time may be determined by empirical testing, e.g., indicating how long an occupant may take to assess a condition of the vehicle 20 and take appropriate counter measures, e.g., providing input to the user interface 44 and exiting the vehicle 20 via the door 46. The minimum amount of time may be equal to or longer than such time. Empirical testing may also indicate how long the battery assembly 36 is anticipated to provide power sufficient to command the actuator 28 to break the window 24. The minimum amount of time may be equal to or shorter than such time. The value of the minimum amount of time may be stored in memory of the computer 34 of the vehicle 20, e.g., upon manufacture of the vehicle 20, provided to the vehicle 20 as an update to data stored in memory of the computer 34, etc.

The computer 34 may be programmed to command the user interface 44 to alert an occupant of the vehicle 20 that the temperature of the battery assembly 36 is above the threshold. For example, the computer 34 may transmit data via the communication network 32 to the user interface 44 specifying that the user interface 44 provide a message to the occupant of the vehicle 20. The computer 34 may command the user interface 44 to provide the alert while waiting the minimum amount of time. In other words, the computer 34 may command the user interface 44 to provide the alert after determining that the temperature of the battery assembly 36 is above the threshold and before commanding the actuator 28.

The computer 34 may be programmed to refrain from commanding the actuator 28 to break the window 24 in response to receiving data specifying an override. The override is an indication from an occupant of the vehicle 20 indicating that the occupant does not want the window 24 to be broken. In other words, the occupant may provide the override to prevent the window from breaking. The computer 34 may receive data specifying the override from the user interface 44. For example, the alert may that the temperature of the battery assembly 36 is above the threshold may include a communication to the user indicating the window 24 will be broken unless the occupant provides an input to the user interface 44. The user interface 44 may transmit data specifying the override to the computer 34 in response to receiving such input.

Figure 7:
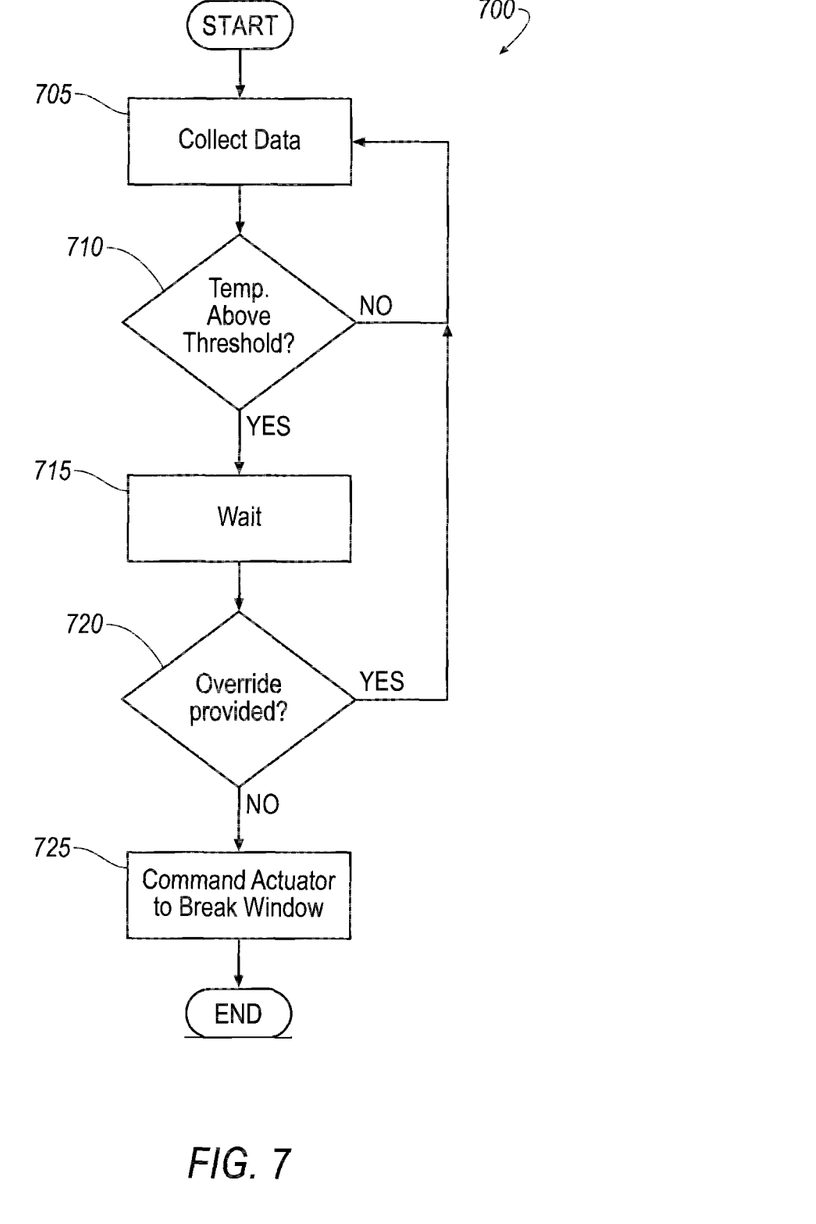
FIG. 7 is a process flow diagram of a process for controlling the window-breaking assembly.

FIG. 7 is a process flow diagram illustrating an exemplary process 700 for operating the window breaking assembly 22. The process 700 begins in a block 705 where the computer 34 collects data, e.g., from the temperature sensor 30 via the communication network 32. The computer 34 may collect data substantially continuously, at intervals (e.g., every 200 milliseconds), etc.

Next, at a block 710 the computer 34 determines whether a temperature of the battery assembly 36 is above the threshold temperature, e.g., based on data from the temperate sensor received at the block 705 and as described herein. In response to determining the temperature is above the threshold temperature the process 700 moves to a block 715. In response to determining the temperature is not above the threshold temperature the process 700 may return to the block 705, e.g., without commanding the actuator 28 to drive the striker 26 into the window 24. Alternately, in response to determining the temperature is not above the threshold temperature the process 700 may end, e.g., without commanding the actuator 28 to drive the striker 26 into the window 24.

At the block 715 the computer 34 waits for the minimum amount of time to lapse. While waiting, the computer 34 commands the user interface 44 to alert an occupant of the vehicle 20 that the temperature of the battery assembly 36 is above the threshold temperature, e.g., by transmitting data specifying the alert to the user interface 33 via the communication network 32. The command may specify that the window 24 may be broken within a specified amount of time, e.g., unless an override is received. The command may also specify the user interface 44 provide an override request. The override request is a communication to an occupant of the vehicle 20 indicating a query to occupant regarding whether the occupant desires to override the window breaking assembly 22 and prevent the window 24 from being broken.

At a block 720 the computer 34 determines whether the override was provided by the occupant, i.e., whether data was received by computer 34 from the user interface 44 specifying that the occupant desires to override the window breaking assembly 22 proceeding to break the window 24. The computer 34 may determine whether the override was provided by the occupant while waiting the minimum amount of time. In response to determining that data specifying the override was not received by the computer 34, the process 700 moves to a block 725. In response to determining that data specifying the override was received by the computer 34 the process 700 may return to the block 705, e.g., without commanding the actuator 28 to drive the striker 26 into the window 24. Alternately, in response to determining that data specifying the override was received by the computer 34 the process 700 may end, e.g., without commanding the actuator 28 to drive the striker 26 into the window 24.

At the block 725, and after waiting the minimum amount of time, the computer 34 commands the actuator 28 to drive the striker 26 into the window 24, e.g., causing the window 24 to break. For example, the computer 34 may transmit data to the actuator 28 via the communication network 32 specifying combustion of the pyrotechnic charge 60. After the block 725 the process 700 may end.

With regard to the process 700 described herein, it should be understood that, although the steps of such process 700 have been described as occurring according to a certain ordered sequence, such process 700 could be practiced with the described steps performed in an order other than the order described herein. It further should be understood that certain steps could be performed simultaneously, that other steps could be added, or that certain steps described herein could be omitted. In other words, the description of the process herein is provided for the purpose of illustrating certain embodiments and should in no way be construed so as to limit the disclosed subject matter.

Computing devices, such as the computer 34, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to" and "based on" in this document indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a window;
   a striker positioned to strike the window;
   an actuator positioned to drive the striker;
   a temperature sensor in communication with the actuator;
   a battery assembly, the temperature sensor positioned to detect a temperature of the battery assembly; and
   a computer having a processor and a memory storing instructions executable by the processor to determine that data from the temperature sensor specifies a temperature of the battery assembly above a threshold temperature, and, in response to determining the temperature of the battery assembly is above the threshold temperature, command the actuator to drive the striker into the window.

2. The vehicle of claim 1, wherein the instructions further include instructions to wait a minimum amount of time after determining the temperature is above the threshold temperature before commanding the actuator.

3. The vehicle of claim 2, wherein the instructions include instructions to command a user interface to alert a vehicle occupant while waiting the minimum amount of time.

4. The vehicle of claim 1, wherein the temperature sensor is supported by the battery assembly.

5. The vehicle of claim 1, wherein the temperature sensor is molded into the battery assembly.

6. The vehicle of claim 1, further comprising a passenger cabin above the battery assembly.

7. The vehicle of claim 1, wherein the temperature sensor is a piezoelectric sensor.

8. The vehicle of claim 1, wherein the actuator includes a pyrotechnic charge.

9. The vehicle of claim 1, further comprising a door supporting the window.

10. The vehicle as set forth in claim 1, wherein the threshold temperature is 90% of a combustion temperature of a battery of the battery assembly.

11. A system, comprising:
    a computer having a processor and memory storing instructions executable by the processor to:
    determine that a temperature of a battery assembly of a vehicle is above a threshold temperature based on data from a temperature sensor positioned to detect a temperature of the battery assembly; and
    in response to determining the temperature of the battery assembly is above the threshold temperature, command an actuator to drive a striker into a window of the vehicle to break the window.

12. The system of claim 11, wherein the instructions further include instructions to wait a minimum amount of time after determining the temperature is above the threshold temperature before commanding the actuator.

13. The system of claim 12, wherein the instructions further include instructions to command a user interface to alert a vehicle occupant while waiting the minimum amount of time.

14. The system of claim 12, wherein the instructions further include instructions to, in response to receiving data specifying an override, refrain from commanding the actuator.

15. A method, comprising:
    receiving data from a temperature sensor positioned to detect a temperature of a battery assembly of a vehicle;
    based on data from the temperature sensor, determining whether a temperature of the battery assembly is above a threshold temperature;
    in response to determining the temperature of the battery assembly is above the threshold temperature, commanding an actuator to drive a striker into a window of the vehicle to break the window; and
    in response to determining the temperature of the battery assembly is not above the threshold temperature, refraining from commanding the actuator from driving the striker into the window.

16. The method as set forth in claim 15, further comprising waiting a minimum amount of time after determining the temperature is above the threshold temperature before commanding the actuator.

17. The method as set forth in claim 16, further comprising commanding a user interface to alert a vehicle occupant while waiting the minimum amount of time.

* * * * *